June 13, 1961
J. M. MARKLEY ET AL
2,988,012
SYSTEM AND MEANS FOR SUPPORTING AND HANDLING
MATERIALS ALONG A WORK LINE
Filed March 24, 1958
4 Sheets-Sheet 1
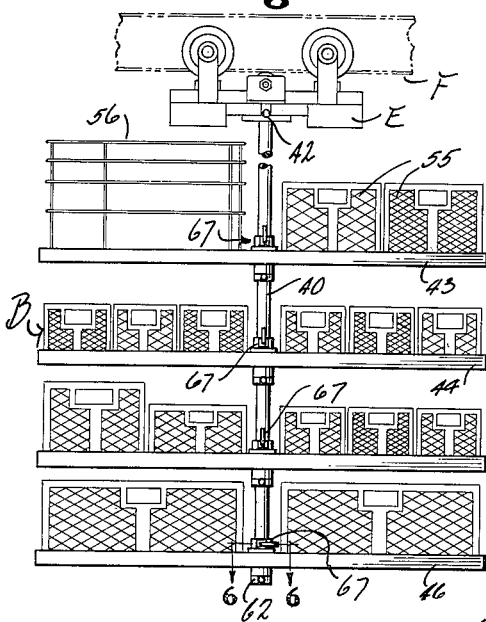
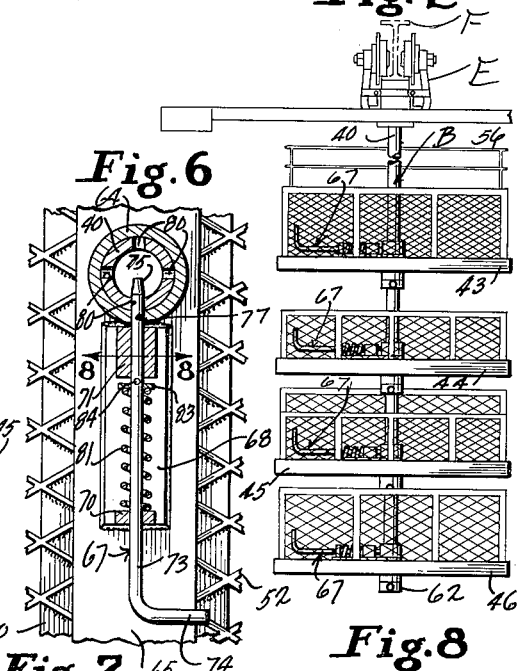
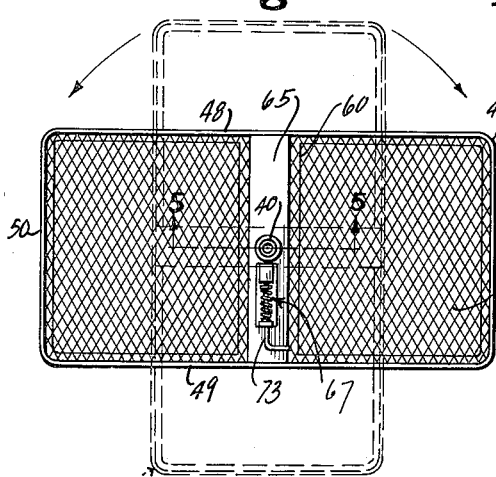
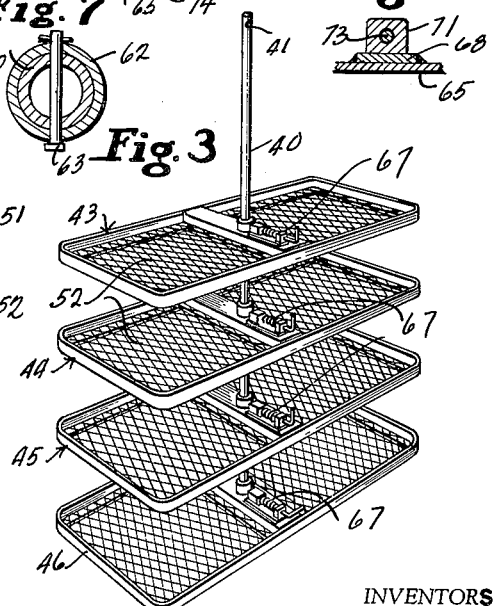
INVENTORS
James M. Markley
Claude D. Parham
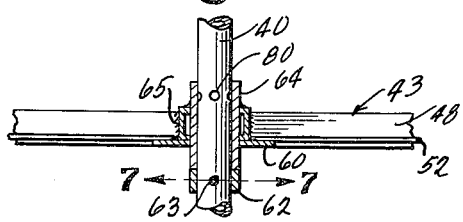
ATTORNEYS

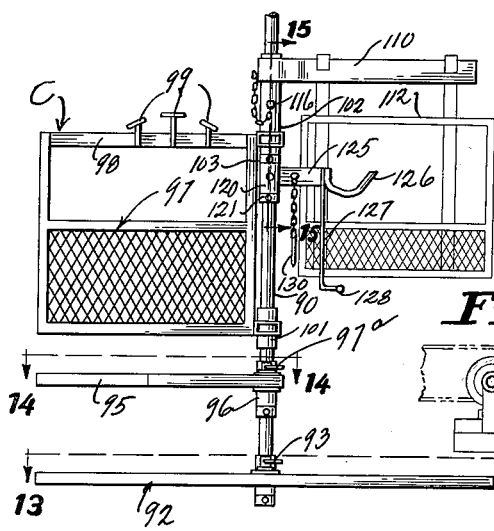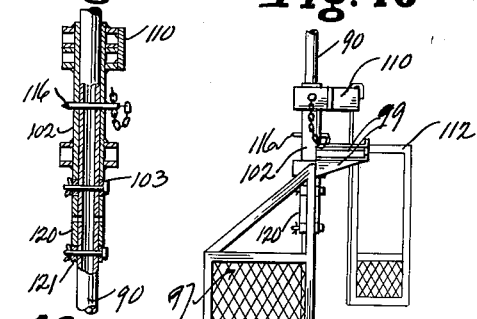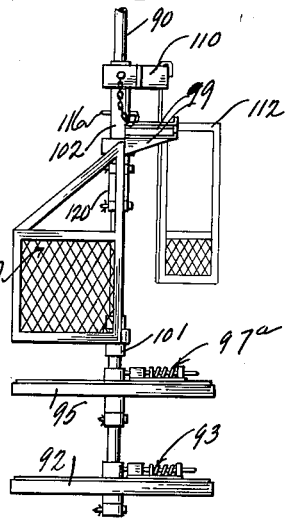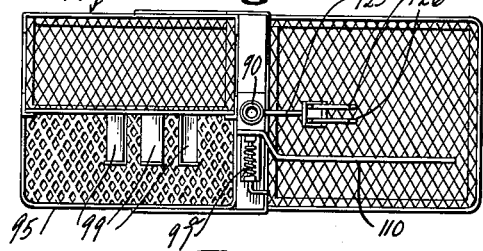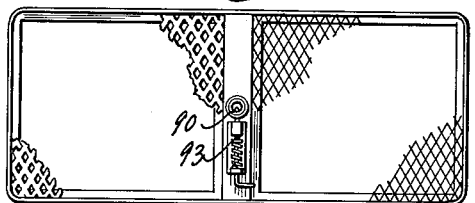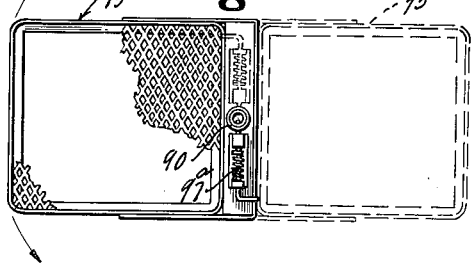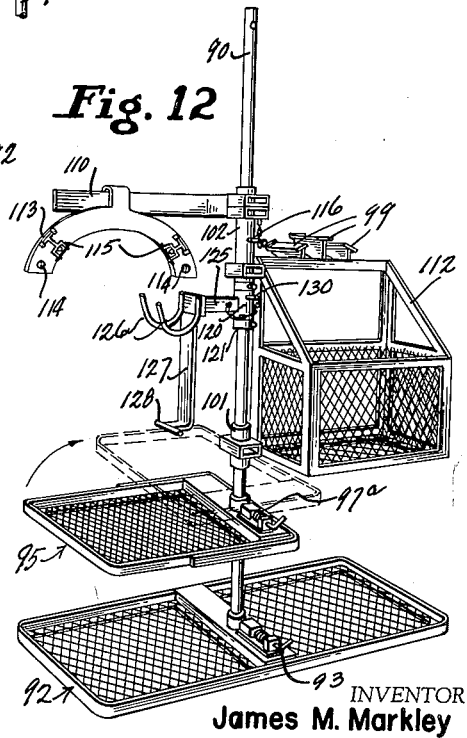

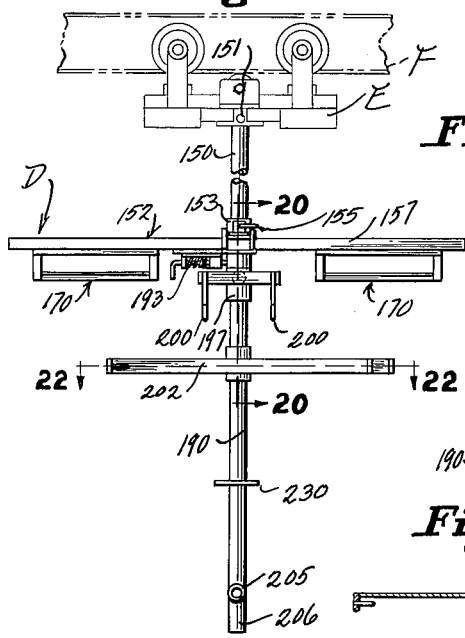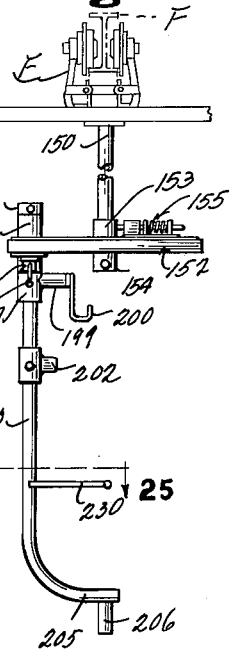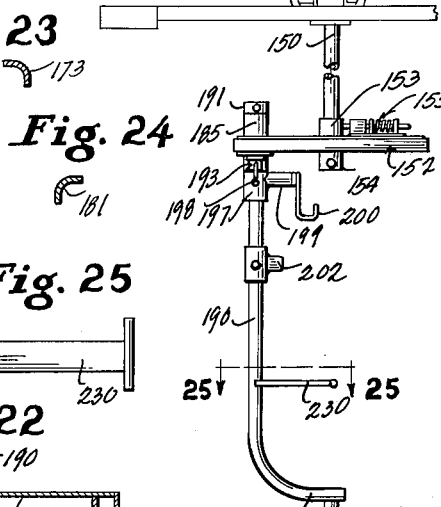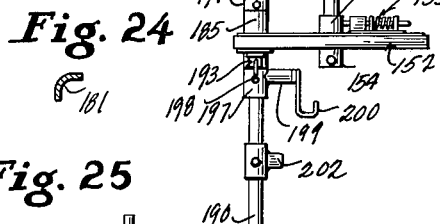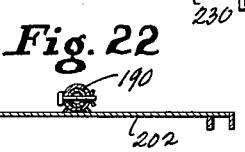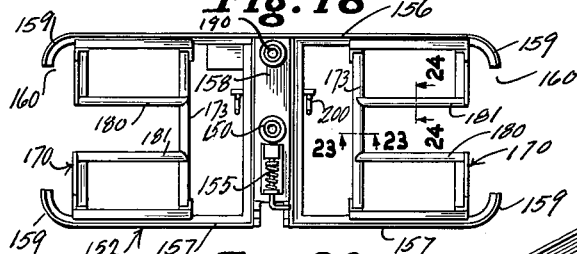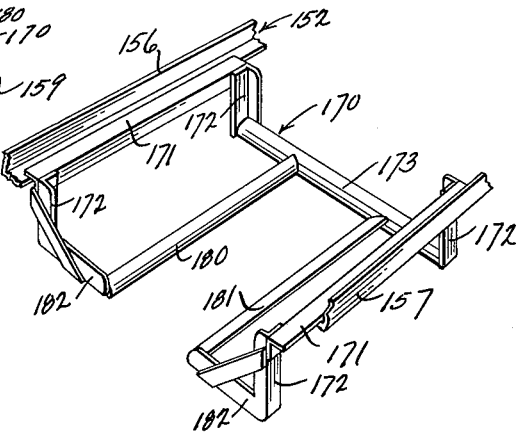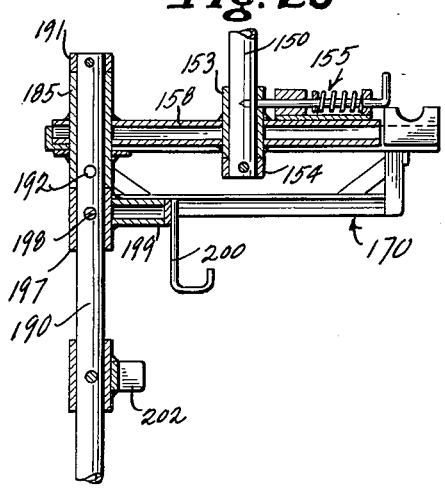

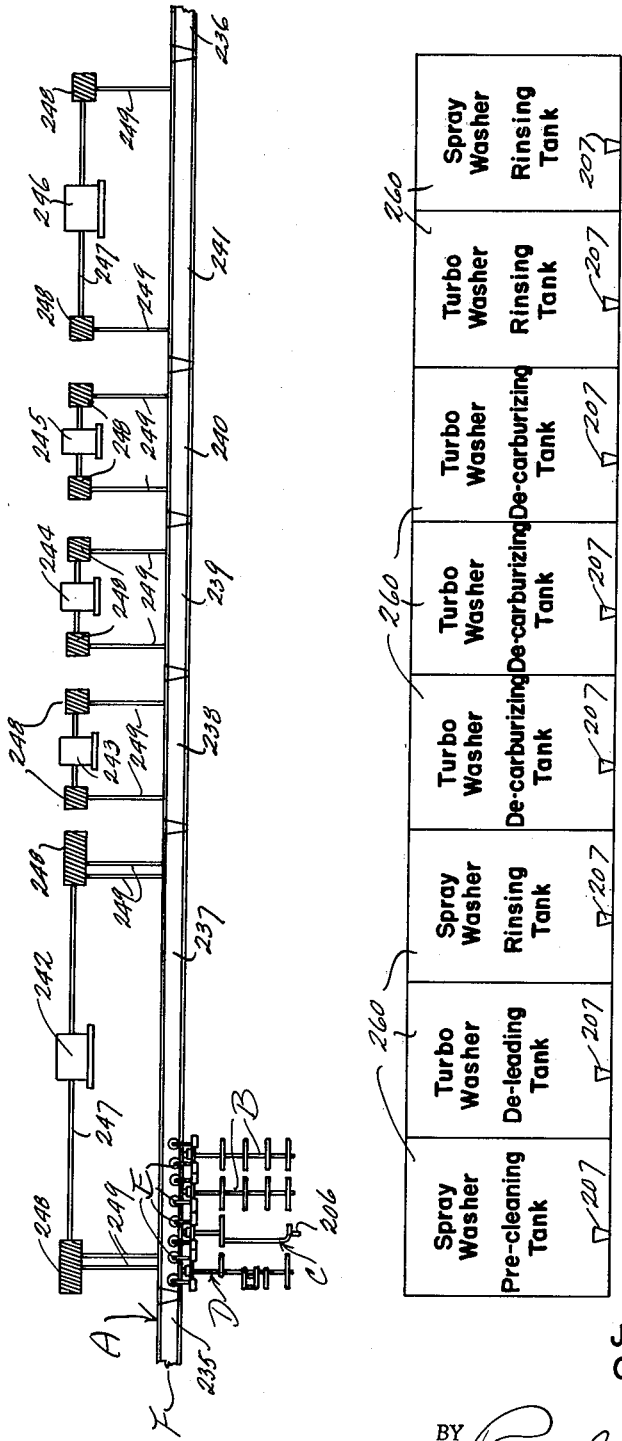

2,988,012
SYSTEM AND MEANS FOR SUPPORTING AND HANDLING MATERIALS ALONG A WORK LINE

James M. Markley, Miami, and Claude D. Parham, Hialeah, Fla., assignors to Eastern Air Lines, Inc., New York, N.Y., a corporation of Delaware
Filed Mar. 24, 1958, Ser. No. 723,487
2 Claims. (Cl. 104—93)

This invention relates to improvements in a system and means for the efficient and economical handling of materials which need to be transported along a work-line for the performance of various operations upon the materials being handled.

The primary object of this invention is the provision of an improved system and means for the handling of materials for the efficient disposition and transportation of the same to various locations along a monorail for the performance of work upon such materials. Specifically, the invention relates to a monorail system of supporting standards upon trolleys adapted to ride along the monorail, and upon which standards is located supporting equipment, particularly well adapted for receiving the disassembled parts of reciprocating engines used upon modern aircraft in such manner that each part has its exact position upon the supporting standards, whereby the parts can be compactly and efficiently transported to various locations where different operations are to be performed thereon, such as cleaning, magnaflux, quality control, repairs, and sub-assembling.

A further object of this invention is the provision of an improved system and means for the manipulation of materials along a work-line where different operations are to be performed upon such materials, in such a manner that the materials do not have floor or ground contact as they are transported along the work-line; the parts of the improved mechanism comprising this system being compactly arranged so that a large number of parts to be operated upon can be stored in a very confined and compact space.

One of the large problems incident to the overhauling of modern aircraft engines is inability to efficiently arrange disassembled parts in order that they can be readily located and properly positioned for various operations, such as cleaning, etc. with assurance that all surfacing of the parts to be cleaned, etc. are accessible for such cleaning. It is therefore a primary object of this invention to provide a monorail system for the support of brackets, baskets, supporting arms and other parts upon standards or so called "trees"; the latter being mounted upon trolleys for travel upon a monorail system along a work-line; means being provided for simultaneous travel of a series of standards or "trees" upon a monorail section, the latter of which has means for lowering the same into various performance operating tanks, such as pre-cleaning tanks, de-leading tanks, rinsing tanks, decarburizing tanks, and the like. This system and means of effectively cleaning and treating and overhauling the various parts of large aircraft engines not only assists in efficient work performance, but enables reduced shop storage area and facilitates the movement of personnel throughout congested areas.

A further object of this invention is the provision of an improved system and means for the handling of materials upon a series of standards adapted to travel along a monorail, the latter of which has associated therewith improved means for elevating and lowering sections of the monorail bodily with the series of "trees" or standards therewith for the performance of specific operations upon the materials carried by the "trees."

Other objects and advantages of this invention will be apparent during the course of the following detailed description.

In the accompanying drawings, forming a part of this specification, and wherein similar reference characters designate corresponding parts throughout the several views:

FIGURE 1 is a side elevation of one of the improved standards showing the same connected to a suitable trolley mounted upon a monorail (in dotted lines); the "tree" or standard having a trolley system adaptable for travel along the monorail, such as set forth in our co-pending application Serial No. 723,498, filed March 24, 1958.

FIGURE 2 is an elevational view of the equipment shown in FIGURE 1, taken at an angle of 90° with respect thereto.

FIGURE 3 is a perspective view showing the improved supporting standard and shelves mounted thereon which are rotatable throughout 360°.

FIGURE 4 is a plan view of the details shown in FIGURE 3, but showing in dotted lines a right-angled adjusted position of one of the supporting shelves or trays.

FIGURE 5 is a fragmentary enlarged cross sectional view taken substantially on the line 5—5 of FIGURE 4.

FIGURE 6 is an enlarged fragmentary cross sectional view taken through a locking or latching device substantially on the line 6—6 of FIGURE 1.

FIGURE 7 is an enlarged transverse cross sectional view taken substantially on the line 7—7 of FIGURE 5.

FIGURE 8 is a transverse cross sectional view taken substantially on the line 8—8 of FIGURE 6.

FIGURE 9 is a front elevation of another form of standard or "tree" of a type adapted to be supported by a trolley and monorail system, such as shown in FIGURE 1, but showing a different arrangement of brackets, baskets, trays and shelves for supporting specific parts of an aircraft reciprocating type engine.

FIGURE 10 is a side elevational view of the details shown in FIGURE 9, taken at an angle of 90° with respect thereto.

FIGURE 11 is a plan view of the details shown in FIGURE 9, with the exception of one detachable basket shown in light lines in FIGURES 9 and 10.

FIGURE 12 is a perspective view showing the details of the improved standard or "tree" shown in FIGURE 9.

FIGURES 13, 14 and 15 are cross sectional views, taken substantially on their respective lines 13—13, 14—14 and 15—15 shown in FIGURE 9 of the drawings.

FIGURE 16 is a view showing how the standard or the "tree" shown in FIGURE 9 may be mounted upon a trolley and monorail system.

FIGURE 17 is a front elevational view of another form of standard or "tree," comprising a different arrangement of brackets, shelves and racks adaptable for the support of other parts of an aircraft engine.

FIGURE 18 is a plan view of the details shown in FIGURE 17, taken from a locus below the monorail trolley shown in FIGURE 17.

FIGURE 19 is a side elevational view taken at an angle of 90° with respect to the view shown in FIGURE 17.

FIGURE 20 is an enlarged cross sectional view taken substantially on the line 20—20 of FIGURE 17.

FIGURE 21 is a perspective view of a rack adapted to be carried by the "tree" of FIGURE 17 for supporting such equipment of a reciprocating engine as a propeller shaft and a crank shaft.

FIGURE 22 is a transverse cross sectional view taken along the line 22—22 of FIGURE 17.

FIGURES 23 and 24 are cross sectional views taken substantially on their respective lines 23—23 and 24—24 shown in FIGURE 18.

FIGURE 25 is an enlarged cross sectional view taken substantially on the line 25—25 of FIGURE 19.

FIGURE 26 shows a diagrammatic representation of the manner in which the standards or "trees" are manipulated in series along a monorail from an "up station" to a "down station"; said hoisting mechanism being capable of simultaneously elevating and lowering the series of "trees" or standards at each of a plurality of locations along the monorail for the performance of various operations thereon.

In the drawings, wherein for the purpose of illustration is shown a preferred embodiment of the invention, the letter A may generally designate the improved system and means for the transportation and handling of materials as will hereinafter be more fully described, and which preferably comprises a series of supporting standards or "trees" differently designed and arranged for the support of special parts. By way of example, B designates the form of "tree" or standard shown in FIGURES 1 to 8 inclusive; C the form of "tree" or standard shown in FIGURES 9 to 16 inclusive; and D the form of "tree" or standard shown in FIGURES 17 to 25 inclusive, each of which "trees" or standards B, C and D are adapted to be supported by identical trolley mechanisms E for travel along a monorail F in a manner which has been described and detailed in our co-pending application Serial No. 723,488, filed March 24, 1958.

Referring to the form of "tree" or material supporting device B, the same includes a preferably tubular standard 40, the upper end of which is provided with an opening 41 therein for attachment to the trolley E in the manner described in our above identified co-pending application, by means of a supporting or connecting pin 42, shown in FIGURE 1.

The "tree" B is adapted to support a plurality of shelves or racks 43, 44, 45 and 46, substantially identical. These shelves or racks 43 to 46 inclusive each comprises a rectangular frame of angled material, including long sides 48 and 49 and shorter ends 50 and 51, the corners of connection of the angles being struck from a radius, so as to avoid sharp corners. The angled material of the sides and ends 48 to 51 inclusive, of each rack, includes a horizontal flange portion as a bottom upon which is supported a foraminous expanded metal base 52, which may be peripherally welded to the flange. A flange of each of the angles extends upwardly to provide a shallow walled receptacle for receiving any of a plurality of detachable baskets 55, or wire bar racks 56, such as is shown in FIGURE 1. The shape, size and arrangement of these baskets is important only insofar as they are adaptable for receiving the parts of the engine or other equipment to be processed. The position of these baskets is important insofar as they enable an optimum treatment of the parts disposed therein at minimum cost. All of the various shapes and sizes of baskets for receiving the smaller parts of reciprocating type aircraft engine are not shown, and indeed some parts of the engine are adaptable for support directly upon the shelves 43, 44, 45 and 46.

The shelves 43, 44, 45 and 46 are rotatably supported in horizontal planes upon the supporting standard or tubing 40. To that end they each include a cross plate 60 which may be welded to the sides 48 and 49 midway between and paralleling the angle ends 50 and 51. This plate 60 forms a base for supporting means and also a locking mechanism. To that end, a collar 62 is fixedly connected by a pin 63 upon the standard 40. A sleeve 64 is box connected at 65, as by welding to the rack plate 60 and is rotatably disposed upon the standard 40; the same resting upon the fixed sleeve 62 in order to locate the shelf in the proper vertical plane for rotatable adjustment.

In connection with each shelf 43, 44, 45 and 46 there is provided a latching or lock mechanism 67 by which the rectangular trays may be latched or locked in position upon the standard. This lock mechanism 67 is shown in FIGURE 6 and includes a plate 68 welded to the part 65. Outer and inner apertured lugs 70 and 71 are welded to the plate 68 or otherwise secured thereto. A latch pin 73 is reciprocably supported in the apertures of lugs 70 and 71. It has a right-angled finger engaging handle 74 at the outer end thereof and a preferably tapered pointed latching end 75 adapted to slidably extend through a suitable opening 77 provided in the sleeve 64 for insertion in any of four sockets 80 provided in the standard 40, at 90° apart, as is shown in FIGURE 6. A compression spring 81 is located upon the latch pin 73, engaging the supporting lug 70 at one end and a washer 83 at its opposite end; the latter being held in fixed position upon the pin 73 by a stop pin 84. Normally, the spring 81 urges the pin 73 into the position shown in FIGURE 6, for entering one of the openings 80. The trays 43, 44, 45 and 46 may be placed in parallel position with their longitudinal axes extending in the monorail line of travel of the various "trees," or the racks may be positioned at right angles to such location, as shown by the dotted lines in FIGURE 4 of the drawings. The loading position for the baskets and other materials to be supported upon the shelves is shown in the dotted lines of FIGURE 4, and the travel position is shown in FIGURES 1 and 2.

Referring to the form of "tree" or standard C shown in FIGURES 9 to 16 inclusive, the same is adapted to support baskets, rack shelves, and hangers in an arrangement best adapted to position the parts of aircraft engines, for transporting and the efficient processing thereof. To that end the "tree" C comprises a standard 90, pin connected at 91 to the trolley E which is adapted to travel along the monorail F.

Close to the bottom of the standard 90 is supported a shelf or rack 92 of the same construction as the racks or shelves above described for the form of "tree" B, and having a similar latching or locking mechanism 93, and similarly supported upon the shaft for rotation through 360° and for locking at 90° angles by the collars or sleeves shown in FIGURE 5 in the form of invention B. Above the rack 92 there is supported a half shelf 95 upon a sleeve mechanism 96 similar to that shown in FIGURE 5, and which includes a locking or latching mechanism 97a similar to that shown in FIGURE 6 for the form of invention B. This shelf extends to one side only of the standard 90 in order that the rack 92 may support, upon the other unobstructed portion thereof, an engine part much higher than the space existing between the shelves 92 and 95. The shelf 95 may support baskets or foraminous shaped boxes for containing small engine parts.

The standard 90 above the half shelf 95 rotatably supports at one side of its axis a basket 97 for receiving engine parts such as aluminum or magnesium oil transfer rings. It is provided with an upper supporting bar 98 having casing ring supporting brackets 99. This basket 97 has welded or otherwise secured thereto, at its lower end a box and sleeve 101, rotatably disposed upon the standard 90. At its upper end basket 97 has secured thereto a similar box and a sleeve 102; the latter receiving the standard 90 therethrough. The standard 90 is provided with a fixed sleeve 103 thereon (see FIGS. 9 and 15) which supports the sleeve 102 in position. To the upper end of sleeve 102 is secured a supporting bar 110, which is laterally offset, as shown in FIGURE 11, to one side of the standard 90. This bar 110 is adapted to receive, in detachable relation thereon, a basket or tray 112 or a detachable arcuate shaped bracket 113 upon which is adapted to be supported an aircraft engine casing, of the Wright type. The bracket 113 is provided with casing locating studs 114 at the ends thereof and may be provided with toggle clamps 115 thereon for the purpose of securing the engine casing in suspended position upon the arcuate bracket 113. It will be noted that a locking pin 116 is provided, supported by a chain from the structure of the tube 102, adapted to be inserted through any of the number of openings in and around the standard 90 in order to latch or lock the basket 97 and the supporting arm 110 in desired positions.

The standard 90 is furthermore provided with a sleeve 120 rotatably mounted thereon and held by a fixed sleeve 121, at a location below the supporting bar 110, upon which is laterally connected an arm 125 provided with supporting bracket type prongs 126 thereon adapted to vertically support an aircraft engine casing such as the Pratt and Whitney type. Such case (not shown) is hung on the prongs and maintained vertically in position by a bracket 127 provided with a foot 128 for such purpose. It is shown in FIGURE 12. The bracket structure sleeve 120 rotates upon the vertical standard 90 and is provided with a locking pin 130 to hold it in adjusted locked position.

It will be noted that the arcuate engine supporting hanger 113 is permitted to slide along the horizontal bar 110 whereby it can accommodate different sized cases. The segment 113 can be removed and attached to the case by the two toggle clamps 115 and then hung on the arm 110. It will be noted that the supporting arm 110 and the basket 97 rotate together upon the standard 90. It is obvious that when the bracket 113 is used for supporting an engine casing the casing supporting prong type brackets 126 are not used, and may be rotated to an out-of-the-way position.

Referring to the rack D shown in FIGURES 17 to 25 inclusive, the same includes a standard 150. It is relatively short and pin connected at 151 to the trolley E in the same manner as the above described standards B and C. The reason the standard 150 is short is because bracket means is provided for supporting a heavy engine casing at a location such that the major weight of the casing must be located directly below and preferably in line with the vertical axis of the standard 150. To that end a horizontal supporting platform 152 is rotatably supported by a sleeve 153 upon the standard 150, held by a fixed sleeve 154 on said standard 150, in the same manner as above described for the rack B. A locking mechanism 155, similar to the latching mechanism 67 above described, is also provided in order to latch the platform 152 in any positions 90° apart around the standard. The platform 152 is of rectangular form, as shown in FIGURE 18, and comprises angle type side bars 156 and 157 having a central connecting box 158 upon which the latch 155 above described is mounted. The ends of the side bars 157 are convexly curved at 159, defining end openings or spaces 160, into which it is possible to insert propeller shafts and crank shafts.

Cradles 170 are provided for support upon the platform 152, at each side of the standard. These cradles are adapted to support propeller and crank shafts and are not connected to the angle bars 156 and 157. They each comprise supporting angle pieces 171 adapted to rest upon the inside flanges of the bars 156 and 157 as shown in FIGURE 21. They have depending legs 172. The inside legs 172 are connected at their lower ends by a cross bar 173 extending from one side of the cradle to the other. The bar 173 has connected thereto propeller shaft supporting bars 180 and 181 which are welded at their inner ends to the bar 173. The outer ends of bars 180 and 181 are welded to horizontal arms 182 connected to the lower ends of legs 172 at the outside of the respective cradles. The attaching flanges of the crank or propeller shafts (not shown) are adapted to rest upon the supporting bars 180 and 181 with the shafts vertically depending in the space therebetween. Bars 180 and 181 are convexly rounded to prevent damage to the shafts. The spaces 160 enable these propeller and crank shafts to be slipped easily into place at each side of the standard 150. The bars 156 and 157 of the platform 152 may support baskets (not shown) for receiving various parts of an engine assembly such as pump and sump and plated parts.

The box 158 is securely welded to the sleeve 153. Laterally of the axis of the standard 150, a vertical sleeve 185, shown in FIGURE 20 is welded to box 158. This sleeve 185 receives a J-shaped shaft type supporting bracket 190 having a pin secured sleeve 191 at its upper end, bearing on top of the sleeve 185. The shaft 190 rotates in the sleeve 185 for adjustment purposes; the same having an opening 192 therein into which the pin of latch 193 may be inserted to lock the J-shaped bracket 190 in adjusted position. Immediately below the sleeve 185 is provided a sleeve 197 pin connected at 198 to the shaft 190, having a laterally extending bracket arm 199 thereon. The latter has casing supporting hooks 200, preferably two in number, as shown in FIGURE 17, which are adapted to support a fire seal case. This fire seal case (not shown) is prevented from fluttering by a bracket detail 202 consisting of a horizontal arm secured by a pin to the bracket shaft 190. The laterally turned end 205 (see FIG. 19) of the bracket shaft 190 has a depending stud 206 at the outer end thereof, out of axial alignment with the shaft 190. It is adapted to be seated within a suitable socket 207 provided therefor, shown in the diagrammatic view of FIGURE 26, for holding the "tree" D against vibration and in proper position while parts supported by the "tree" D are being cleaned or otherwise processed. The shaft 190, below the arm 202, is provided with a T-shaped stabilizing arm 230 to prevent the fire case from rotating.

FIGURE 26 is a diagrammatic view showing the system A. The monorail F is there shown as including an "up station" 235 and a "down station" 236 thereon, with intermediate monorail sections 237, 238, 239, 240 and 241 which can be elevated and lowered by means of electric hoists 242, 243, 244, 245, and 246. The hoists have shafting 247 with drums 248 thereon and supporting cables 249 by means of which the individual movable monorail sections may be elevated and lowered.

It is intended that four of the standards or "trees" will be utilized for supporting the completely disassembled parts and units of a reciprocatory aircraft engine. Two of these in all likelihood will be similar to the "tree" B, and a standard C and standard D will also be used in the series. One series is shown in FIGURES 26, above tank 260. These tanks are located in line, and any number of them, suitable for the purpose, are provided; the series of "trees" or standards being such that the four of them comprising a series may be lowered into each of the tanks by the respective movable monorail sections above described. The tanks 260 have been identified in FIGURE 26. Preferably in each of these tanks is located one centering socket 207 to stabilize the position of the "tree" C when lowered. The socket 207 may be a cone and receives the stud 206 therein.

The operator will place the "trees," from the "up station," in position over the first tank 260. The electric hoist will lower the series of "trees" into this tank for pre-cleaning, and spray wash. The tanks 260 may be of any approved construction and may have closed tops and suitable mechanism for automatically opening and closing the same. The "tree" series is moved along the monorail system and lowered by the monorail system progressively into the various tanks 260. Tanks of this sort are well known in the art and some of them have turbine impellers for circulating the solution in order to effectively clean the various parts of the engine.

Various changes in the shape, size, and arrangement of parts may be made to the forms of invention herein shown and described, without departing from the spirit of the invention or scope of the claims.

What is claimed is:

1. In a system for the transportation and processing of materials such as aircraft engine parts, the combination of a horizontal monorail, a trolley movable along the monorail, a depending standard non-rotatably supported by the trolley in depending relation below the monorail and trolley, a sleeve rotatably supported upon said standard against endwise movement, a laterally extending arm rigidly connected to the sleeve, spaced aircraft engine supporting prongs carried at the outer end of said arm for supporting an aircraft engine casing, a depending engine stabilizing foot connected to the arm and having a lateral extension below said prongs, and means for selectively locking the sleeve in desired positions around said standard against rotational movement.

2. In a monorail supported tree for the transportation and handling of materials, the combination of a monorail trolley having a depending vertically positioned standard connected thereto, a plurality of rotatable sleeves mounted on said standard, latching means for locking the said sleeves respectively in various positions around the standard, a plurality of material supporting arms mounted on one of said sleeves at different levels and extending laterally in opposite directions from said sleeve, and an arm laterally supported on another of said sleeves to one side of said standard having a vertically depending leg and a bottom foot and article supporting means above the foot.

References Cited in the file of this patent

UNITED STATES PATENTS

| | | |
|---|---|---|
| 343,276 | La Bar | June 8, 1886 |
| 630,990 | Salmond | Aug. 15, 1899 |
| 640,736 | Biester | Jan. 9, 1900 |
| 988,269 | Joyce | Mar. 28, 1911 |
| 1,117,545 | Beausejour | Nov. 17, 1914 |
| 1,150,003 | Focardi | Aug. 10, 1915 |
| 1,345,226 | Paris | June 29, 1920 |
| 1,626,022 | Corbett | Apr. 26, 1927 |
| 1,637,305 | Hendsch | July 26, 1928 |
| 1,812,689 | Farrar | June 30, 1931 |
| 2,471,506 | Wiswall | May 31, 1949 |
| 2,591,681 | Davis | Apr. 8, 1952 |
| 2,591,682 | Davis | Apr. 8, 1952 |
| 2,692,168 | Gregory | Oct. 19, 1954 |
| 2,693,989 | Santana | Nov. 9, 1954 |
| 2,780,229 | Davis | Feb. 5, 1957 |
| 2,851,044 | Davis | Sept. 9, 1958 |